Aug. 13, 1940.  O. G. RIESKE  2,210,955
FILLETING MACHINE
Original Filed Nov. 7, 1935  4 Sheets-Sheet 1

Inventor,
Otto G. Rieske
by Walter P. Geyer
Attorney.

Aug. 13, 1940. O. G. RIESKE 2,210,955
FILLETING MACHINE
Original Filed Nov. 7, 1935  4 Sheets-Sheet 2
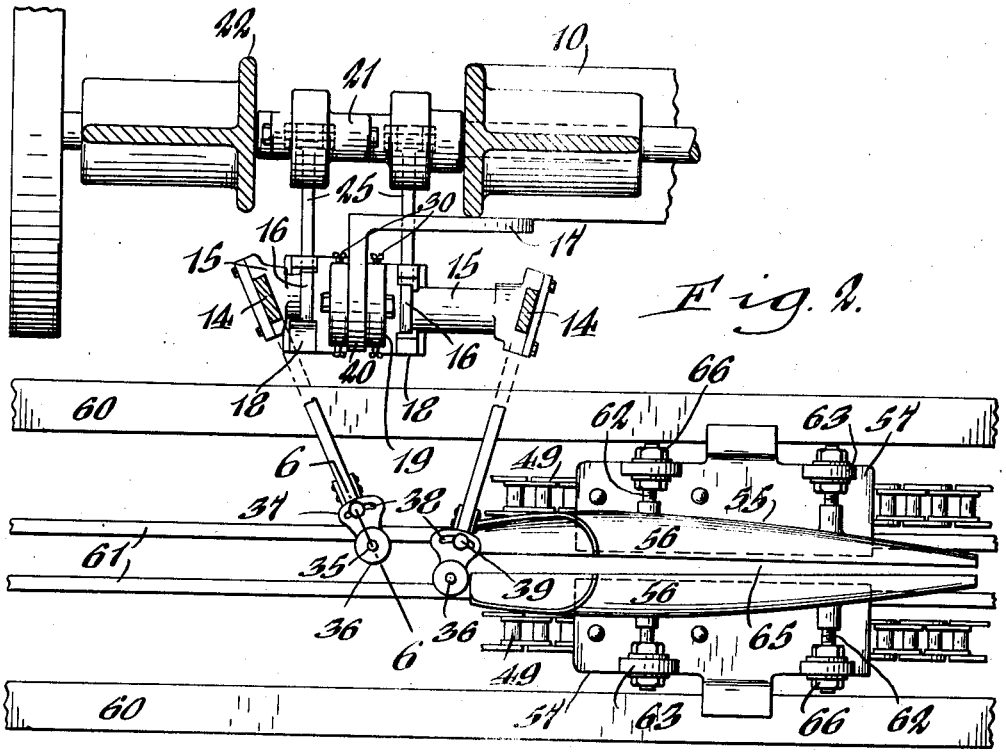
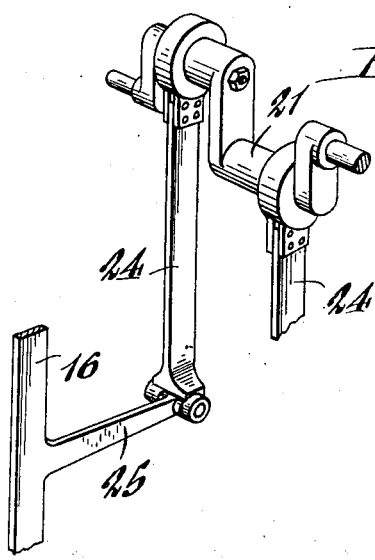
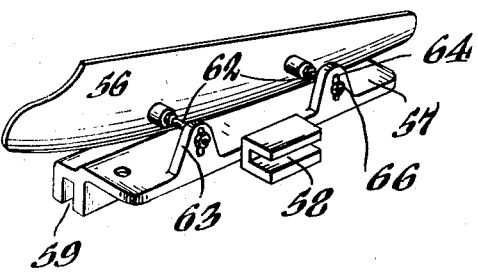
Inventor,
Otto G. Rieske,
by Walter P. Guyer
Attorney.

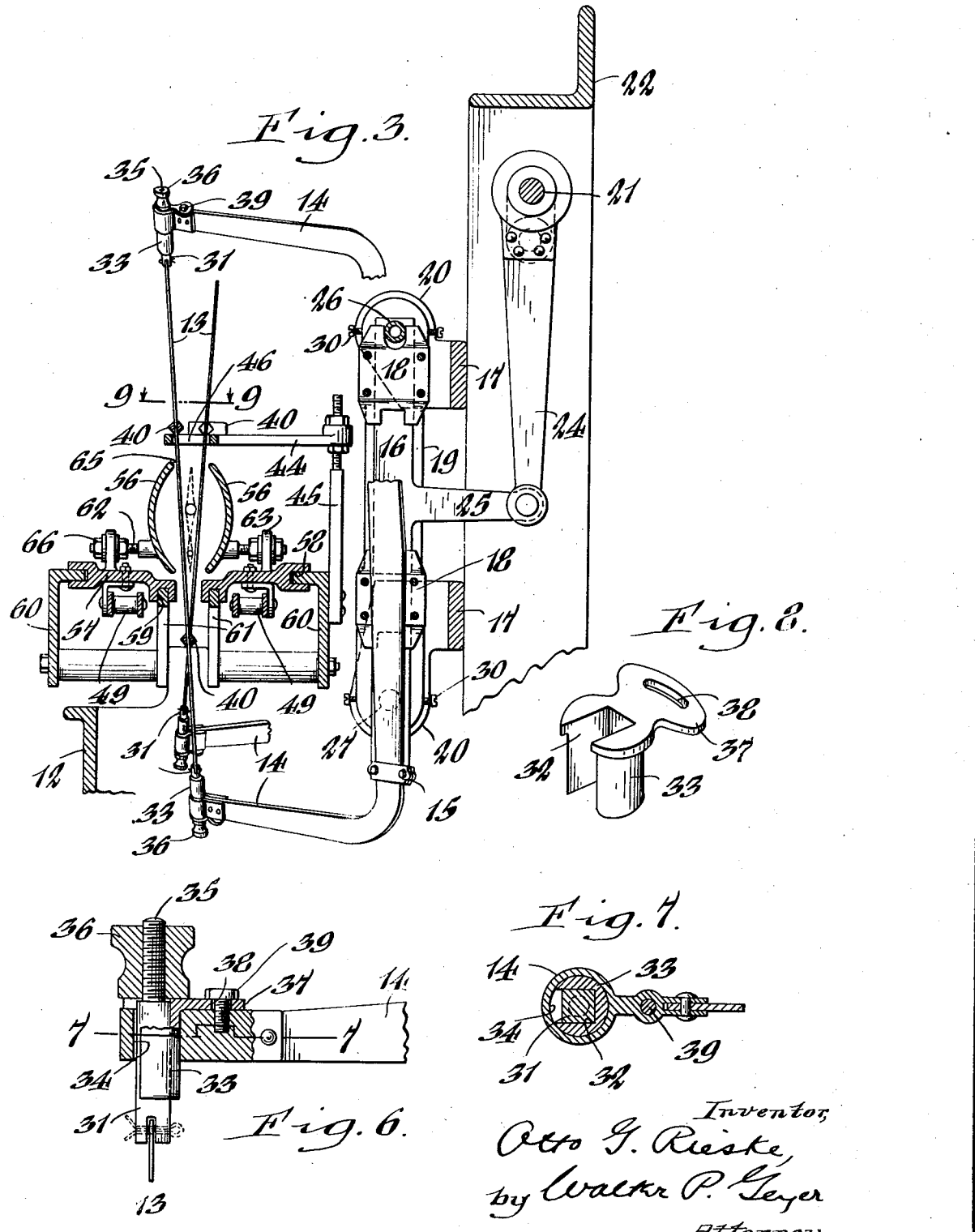

Aug. 13, 1940. O. G. RIESKE 2,210,955
FILLETING MACHINE
Original Filed Nov. 7, 1935 4 Sheets-Sheet 4

Inventor,
Otto G. Rieske,
by Walter P. Geyer
Attorney.

Patented Aug. 13, 1940

2,210,955

UNITED STATES PATENT OFFICE 2,210,955

FILLETING MACHINE

Otto G. Rieske, Buffalo, N. Y.

Application November 7, 1935, Serial No. 48,688
Renewed December 28, 1939

11 Claims. (Cl. 17—4)

This invention relates to new and useful improvements in a filleting machine which has been designed more particularly for slicing fish and removing the center bones therefrom.

One of its objects is the provision of a machine of this character having simple, efficient and reliable means for expeditiously and economically effecting the cutting of the fish on either side of the center bone, back bone and belly bone with a minimum of waste.

Another object of the invention is to provide a high speed cutting mechanism including relatively reciprocating saw blades or knives disposed at an angle to each other to provide a substantially V-shaped cutting throat, in combination with fish carriers movable past the cutter mechanism and so disposed as to effect a gradual lessening of the width of cut from the head-end to the tail-end of the fish.

Other features of the invention reside in the construction and arrangement of parts hereinafter described and particularly pointed out in the appended claims.

Figure 1:
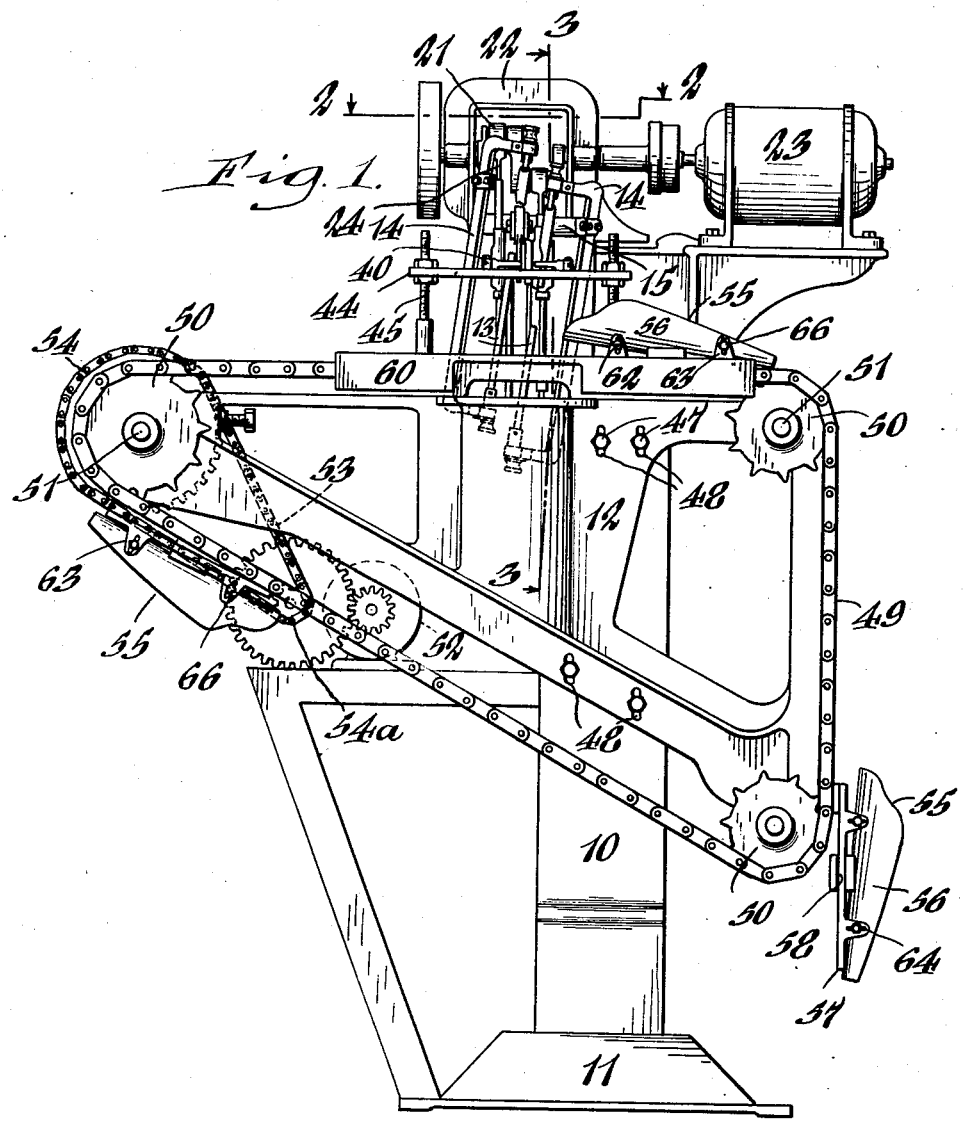
Figure 9:
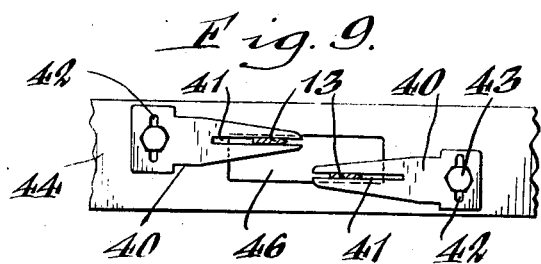
Figure 10:
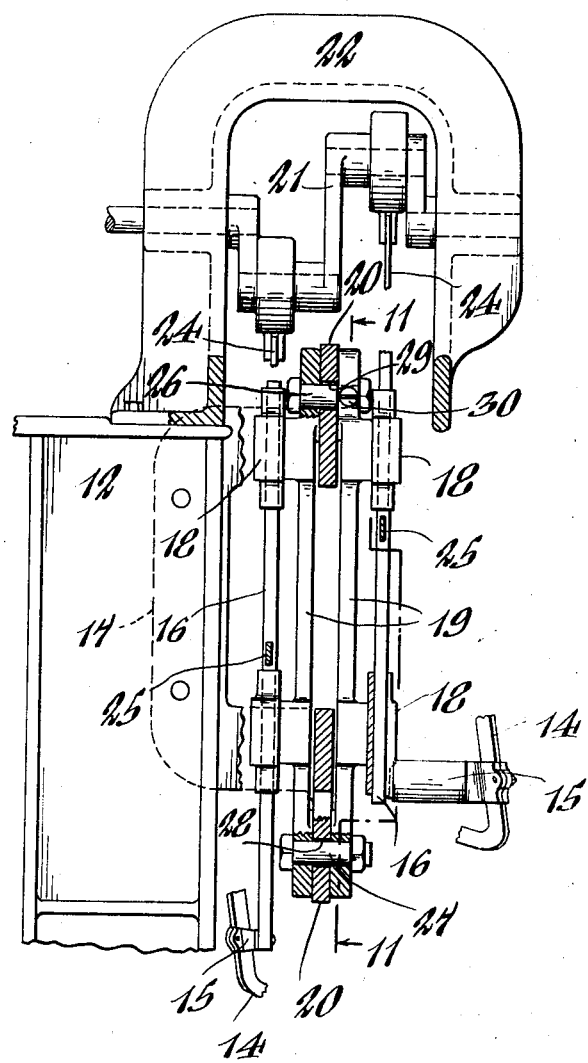
Figure 11:
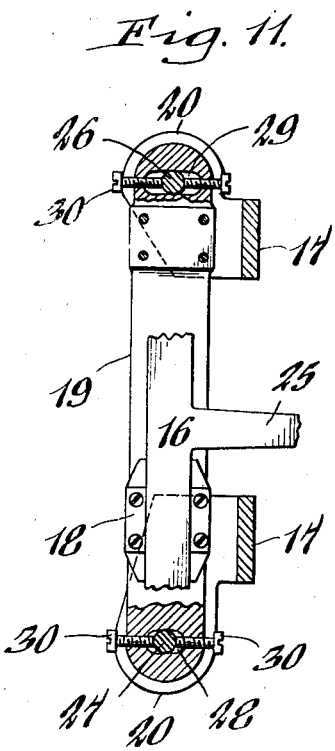

In the accompanying drawings:

Figure 1 is a front elevation of a filleting machine embodying my invention. Figure 2 is an enlarged, fragmentary horizontal section taken substantially in the plane of line 2—2, Figure 1. Figure 3 is an enlarged fragmentary cross section taken in the plane of line 3—3, Figure 1. Figure 4 is a fragmentary, perspective view of the driving means for the reciprocating knives or saw blades. Figure 5 is a detached perspective view of one of the holder sections of the fish carrier and its associated parts. Figure 6 is an enlarged fragmentary vertical section taken on line 6—6, Figure 2, showing the means for connecting the saw blade or knife to the reciprocating cutter yoke. Figure 7 is a horizontal section taken on line 7—7, Figure 6. Figure 8 is a detached perspective view of the adjusting element of the saw blade connecting means. Figure 9 is an enlarged fragmentary horizontal section taken in the plane of line 9—9, Figure 3. Figure 10 is a fragmentary sectional rear view of the reciprocating cutter mechanism and associated parts. Figure 11 is a cross section taken substantially in the plane of line 11—11, Figure 10. Figure 12 is a detail side view of the drive mechanism for the conveyor chains.

Similar characters of reference indicate corresponding parts throughout the several views.

In its general organization, this machine comprises a suitable frame for supporting its working parts, a cutting mechanism for producing a substantially wedge shape cut lengthwise through the fish on either side of its center bone, back bone and belly bone, and a conveyor having holders for carrying the fish past the cutting mechanism.

The frame of the machine may consist of two sections, one section, for example, being in the form of a standard 10 rising from a base 11 for supporting the cutting mechanism of the machine, and the other section consisting of a substantially triangular-shaped frame 12 mounted on the standard for supporting the conveyor mechanism.

The cutting mechanism is preferably constructed as follows:

The numerals 13, 13 indicate a pair of cutter or saw blades which are disposed side by side in spaced parallel relation and which cross each other edgewise to form a wedge-shaped or angular cutting throat between them, the fish being presented to this cutting throat to slice the same on either side and close to the center bone, back bone and belly bone so as to reduce the waste of meat to a minimum. These blades are made of band steel or like flexible material and are detachably mounted on vertically reciprocating frames or yokes 14, 14, of substantially U-shape, which are secured adjacent to the upper and lower ends of their cross bars by tie members 15 to companion vertically-reciprocating slide bars 16, 16 suitably guided for movement relative to and suspended from a bracket 17 secured to the upper end of the standard 10. These slide bars are guided at their upper and lower ends in suitable guide heads 18 applied to companion upright links, or supports 19, 19 which are in turn connected at their upper and lower ends to lugs or ears 20 projecting forwardly from the bracket 17, as seen in Figures 2 and 3.

The slide bars 16 are alternately reciprocated at a comparatively high speed in any appropriate manner, the means shown in the drawing preferably consisting of a crank shaft 21 journaled in a bearing-frame 22 secured to the top of the standard 10 and driven by an electric motor 23 or like source of power. Connecting rods 24 connect this crank shaft with corresponding arms 25 projecting rearwardly from the companion slide bars 16, so that during the rotation of the crank shaft said bars are reciprocated vertically in opposite directions to correspondingly transmit a like movement to the blade-yokes 14, and during which movement the fish traveling through the machine are cut on either side of the center bone.

In order to effect an adjustment of the angular or wedge-shaped disposition of the blades 13, I provide means consisting of adjustable connections between the yoke-supports 19 and the bracket-lugs 20. As seen in Figures 3, 10 and 11, these adjustable connections preferably consist of upper and lower attaching screws or studs 26, 27 which serve to connect the supports 19 to the bracket 17 and extend through the bracket-lugs 20 and through corresponding slots 28 and 29, respectively, formed in the lower and upper ends of such slide-bar supports. The lower slot 28 of each support is preferably slightly elongated transversely thereof while the upper slot 29 of each support is preferably curved or arcuate in shape and is defined by a radius from the lower stud 27. Set screws 30 screwed into the opposite side edges of each support project into the corresponding slots 28, 29 and are adapted to abut against the opposite sides of the companion pivot 26, 27 to accordingly adjust the supports 19 and likewise the position of the blade-yokes 14, 14 to bring their blades 13 into the desired angular relation required to effect the removal of the center bone from a given size and type of fish with a minimum of waste.

While any suitable means may be employed for detachably connecting the cutter blades 13 at their ends to the yokes 14, I preferably employ adjustable connectors or fittings each including a square blade-engaging shank 31 fitted in a notch 32 formed in a rotatable bearing member or block 33 extending through an opening 34 in the free end of the respective yoke and having a screw-threaded shank 35 projecting above the bearing block. A nut 36 applied to this shank serves to properly adjust the connector to meet the required tension of the cutter blade. At one end the bearing block 33 has a laterally-extending flange 37 containing an arcuate slot 38, whereby the connector may be turned in one direction or the other to effect the proper angular disposition of the cutter blade 13, a screw or bolt 39 being employed for holding the bearing block in a desired set position of adjustment. As seen in Figure 6, each blade may be detachably connected to its connector by a cotter pin or like fastening.

For the purpose of guiding the operative portions of the cutter blades 13 and maintaining them in their correct angular position of adjustment during their reciprocation, I provide upper and lower sets of guides 40, the lower set of guides being positioned adjacent the intersecting portions of the blades and the upper set of guides being positioned above the path of travel of the fish being cut. Each of these blade-guides 40 is preferably in the form of an adjustable block and, as shown in Figure 9, is provided with a longitudinal blade-receiving notch 41 and a transverse slot 42 through which pass a fastening bolt or screw 43 for enabling the guide to be adjusted to the predetermined position of the saw blade. The lower set of blade-guides is mounted on the adjoining portion of the frame 12 of the machine, while the upper set of blade-guides may be applied to a supporting rail 44 mounted for vertical adjustment on suitable posts 45 secured to the machine frame. This rail has an opening 46 therein through which the cutter blades extend, in the manner shown in Figures 3 and 9. Upon loosening the clamping bolt 43, each guide 40 may be moved in or out, laterally of its respective support, or swung about the bolt as a pivot to bring the cutter blade at the proper position required for cutting the fish on either side of its center bone.

The triangular frame 12 is fastened to the standard 10 by bolts 47 and to enable this frame to have a limited vertical adjustment on the standard, it has slots 48 through which the bolts pass. The conveying mechanism for carrying and presenting the fish to the cutter mechanism is supported by this frame and preferably consists of two endless chains 49 disposed side by side in parallel relation to each other and passing around sprocket wheels 50 mounted on corresponding shafts 51 located at the three corners of the frame, as seen in Figure 1. Both conveyor chains are driven in unison at a slow speed compared with that of the reciprocating cutter blades 13, and for this purpose an electric motor 52 or like source of power is provided which is connected by a chain 53 and sprockets 54, 54a, respectively, with the left hand sprocket shaft 51. These conveyor chains are driven in a counter-clockwise direction toward the cutting edges of the blades 13, and the upper stretches of these chains are substantially horizontal or at right angles to the path of travel of the blades and are disposed above the point of intersection of the blades.

Mounted at suitable intervals on the conveyor chains 49 are a plurality of fish-holders or carriers indicated generally by the numeral 55. Each of these fish-holders is preferably composed of two sections or walls 56, each section being shaped substantially to the contour of the fish and being concavo-convex in cross section, the sections of a pair being disposed directly opposite each other on the respective chains with their concave faces in opposing relation to form a hollow open ended chamber for receiving and supporting the fish while being cut. Coupled to each of the conveyor chains is a base plate 57 to which the respective holder-section 56 is adjustably and detachably connected, this base plate being provided along its opposite longitudinal edges with a laterally-opening guide groove 58 and a downwardly-opening guide groove 59 which are adapted for engagement with companion track-like elements or rails 60 and 61 for guiding the holder bases along the horizontal stretches of the chains during the cutting operation on the fish. As shown in Figure 5, the holder-sections 56 are provided adjacent their opposite ends with laterally-projecting stud bolts 62 which engage corresponding brackets 63 rising from the base plates 57 and having upright slots 64 therein through which the studs pass and whereby the adjustment of the holder may be readily effected to present the fish in the correct relative relation to the cutter blades. As seen in Figures 2 and 3, the opposing upper and lower edges of the holder-sections 56 terminate short of each other to provide a longitudinal passage 65 between them for receiving the cutter blades as the holder travels past the same to slice the fish. The holder-sections are adjustable toward and from each other to vary the width of the passage 65 in accordance with the particular fish being operated upon, and this adjustment is effected by clamping nuts 66 applied to the stud bolts 62 on either side of the brackets 63. In practice, the holders are slightly inclined to the horizontal as they are presented to the cutter blades 13, the head end of the fish being first to engage the cutter blades with its center bone positioned in the upper, wider portion of the V-shaped throat, and as the fish is propelled forwardly, the center bone, which gradually tapers toward the tail end of the fish, is correspondingly lowered due to the inclined position of the holder, to bring such bone opposite the contracted lower portion of the V-shaped throat, whereby the width of the cut lengthwise through the fish is gradually lessened from the head end to the tail end of the fish.

Briefly stated, the operation of the machine is as follows:

Upon starting the motors 23 and 52, motion is transmitted to the cutter blades 13 and to the conveyor chains 49, the cutter blades reciprocating at a high speed and the conveyor chains traveling at a comparatively slow speed. As the fish holders 55 are presented by the conveyor chains into a vertical position, as seen at the right in Figure 1, the operator drops the fish, tail first, into these holders, and as they are propelled horizontally by the conveyor chains, their guide grooves 58 and 59 engage the tracks 60, 61 to firmly support and properly guide the holders to the reciprocating cutter blades. Due to the inclined disposition of the holders and the angular disposition of the blades to provide a V-shaped cutting throat, an automatic adjustment of the cut as the fish travels past the blades is afforded. As the fish is first presented to the blades, a maximum width of cut on either side of the center bone of the fish is made, and as the fish travels on the width of cut is gradually lessened in accordance with the smaller dimensions of the bone from the head end to the tail end of the fish, the blades being initially set to cut as close to the bone as possible to reduce the waste to a minimum. It will also be noted that the blades 13 are disposed at a slight angle to the vertical with the result that the effective cutting is performed on the down stroke of the blades, thereby insuring a smooth cut. After the cutting operation has been completed, the holders are carried to the left hand end of the machine where the fish are allowed to drop by gravity from the holders, the fish being in three pieces including the bone section and the two fillets.

I claim as my invention:

1. A machine of the character described, comprising a frame, and a pair of reciprocating cutter blades disposed in parallel relation in the direction of their width and crossing each other edgewise thereof to form an angular cutting throat between them for receiving the article to be cut and for cutting such article longitudinally.

2. A machine of the character described, comprising a frame, reciprocating blade-yokes mounted on said frame, means for actuating said yokes, and cutter blades applied to said yokes in parallel relation in the direction of their width and crossing each other edgewise to form an angular cutting throat between them and for cutting such article longitudinally.

3. A machine of the character described, comprising a frame, parallel reciprocating blade-yokes mounted on said frame and disposed obliquely to the vertical, means for actuating said yokes, cutter blades applied to said yokes in parallel relation in the direction of their width and crossing each other edgewise to form an angular cutting throat between them, and a carrier movable at approximately right angles to the path of movement of the blades for presenting the article to be cut substantially centrally between said blades for cutting such article lengthwise at opposite sides of its longitudinal center.

4. A machine of the character described, comprising a frame, reciprocating blade-yokes disposed side by side on said frame, cutter blades applied to said yokes and crossing each other edgewise to form an angular cutting throat between them, and guide means for said yokes including adjustable connections to the frame for effecting the adjustment of the yokes in a direction to accordingly bring the blades into a given angular cutting position.

5. A machine of the character described, comprising a frame, reciprocating blade-yokes disposed side by side on said frame, cutter blades applied to said yokes and crossing each other edgewise to form an angular cutting throat between them, guiding supports for said yokes, and means for adjustably connecting said supports to the frame to effect a lateral tilting of the supports to vary the relative angular edgewise position of the blades.

6. A machine of the character described, comprising a frame, reciprocating blade-yokes disposed side by side on said frame, cutter blades applied to said yokes and crossing each other edgewise to form an angular cutting throat between them, guiding supports for said yokes having pivot-bolt openings at their upper and lower ends, and means for adjustably connecting said supports to the frame to effect a lateral displacement of the supports to vary the relative angular position of the blades, said means consisting of pivot-bolts applied to said frame and engaging said support openings.

7. A machine of the character described, comprising a frame, reciprocating blade-yokes disposed side by side on said frame, cutter blades applied to said yokes and crossing each other edgewise to form an angular cutting throat between them, guiding supports for said yokes, means for adjusting said supports to vary the angular cutting throat of the blades, and a crank shaft journaled in said frame and having connecting rods joined to said supports for actuating said blade-yokes.

8. A filleting machine, comprising a frame, reciprocating cutter blades disposed side by side on said frame and crossing each other edgewise to form an angular cutting throat between them, a carrier for the fish movable past said blades at a point above their intersection, two sets of guides for the blades disposed substantially at the intersecting portions of the blades and at a point thereof above the travel of the carrier, and a supporting rail mounted on said frame above the path of the carrier and having an opening therein for the passage of the blades, said upper set of guides being mounted on said supporting rail and extending across said rail-opening.

9. A filleting machine, comprising a frame, reciprocating cutter blades disposed side by side on said frame and crossing each other edgewise to form an angular cutting throat between them, a carrier for the fish movable past said blades at a point above their intersection, two sets of guides for the blades disposed substantially at the intersecting portions of the blades and at a point thereof above the travel of the carrier, and a vertically adjustable supporting rail mounted on said frame above the path of the carrier and having an opening therein for the passage of the blades, said upper set of guides extending over said rail-opening and being pivoted to said rail for adjustment transversely thereof.

10. A filleting machine, comprising a frame, a conveyor mounted on the same and consisting of a pair of endless belts arranged side by side, said frame having pairs of tracks thereon along the path of the conveyor and disposed in vertical and horizontal planes, plates carried in spaced relation by said belts and arranged in pairs and having vertical and horizontal guide grooves therein engageable with the corresponding tracks, a plurality of fish holders each consisting of companion sections mounted on corresponding pairs of said plates and shaped to receive a fish between them, and cutter blades disposed in the path of movement of said holders.

11. In a fish filleting machine, a blade-yoke, a cutter blade applied thereto, and means for detachably connecting the ends of each blade to its yoke consisting of a rotatable bearing member mounted in each end of the yoke and having a flange projecting laterally therefrom in overlying relation to the yoke, an attaching shank for the blade fitted in said bearing member to turn therewith but free to slide axially thereof and having a screw stem rising therefrom, means engageable with said bearing member flange for adjustably retaining the bearing member in a given position of adjustment, and a nut applied to said shank-stem for adjusting the tension of the blade.

OTTO G. RIESKE.